United States Patent
Klonover et al.

(10) Patent No.: US 7,979,532 B2
(45) Date of Patent: Jul. 12, 2011

(54) SYSTEMS AND METHODS FOR USING AN ACCESS POINT FOR TESTING MULTIPLE DEVICES AND USING SEVERAL CONSOLES

(75) Inventors: Eran Klonover, Hezliya (IL); Yaniv Vakrat, Ashdod (IL); Olga Kuturianu, Holon (IL); Natalia Yankelevich, Kfar Saba (IL); Konstantin Romanovskiy, Saint Petersburg (RU); Fedor Romanov, Saint-Petersburg (RU); Yakov Persky, Holon (IL)

(73) Assignee: Oracle America, Inc., Redwood City, CA (US)

( * ) Notice: Subject to any disclaimer, the term of this patent is extended or adjusted under 35 U.S.C. 154(b) by 1119 days.

(21) Appl. No.: 11/521,469

(22) Filed: Sep. 15, 2006

(65) Prior Publication Data
US 2008/0072050 A1    Mar. 20, 2008

(51) Int. Cl.
*G06F 15/173* (2006.01)
(52) U.S. Cl. ......... 709/224; 709/203; 709/223; 709/225
(58) Field of Classification Search .................. 709/203, 709/217, 218, 219, 227, 223, 224, 225, 226
See application file for complete search history.

(56) References Cited

U.S. PATENT DOCUMENTS

| | | | |
|---|---|---|---|
| 7,254,833 B1 * | 8/2007 | Cornelius et al. | 726/11 |
| 7,290,145 B2 * | 10/2007 | Falkenthros | 713/182 |
| 2003/0208542 A1 * | 11/2003 | Deming et al. | 709/205 |
| 2004/0078384 A1 * | 4/2004 | Keir et al. | 707/102 |
| 2004/0128554 A1 * | 7/2004 | Maher et al. | 713/201 |
| 2006/0026283 A1 * | 2/2006 | Trueba | 709/225 |
| 2006/0026686 A1 * | 2/2006 | Trueba | 726/24 |
| 2007/0067837 A1 * | 3/2007 | Schuster | 726/11 |
| 2007/0162974 A1 * | 7/2007 | Speidel | 726/22 |
| 2008/0267096 A1 * | 10/2008 | Nakamura et al. | 370/261 |

* cited by examiner

*Primary Examiner* — Barbara N Burgess
(74) *Attorney, Agent, or Firm* — Marsh Fischmann & Breyfogle LLP; Karl A. Dierenbach; Kent A. Lembke (57) ABSTRACT

A system and method for testing computing devices is provided. A method for testing computing devices includes providing a suite of test programs on a server for execution by a computing device that is coupled to the server. A test console coupled to the server is used to initiate execution of the tests on the computing device. The server facilitates and coordinates testing between the test console and the computing device. The server provides the test console with results of the tests.

18 Claims, 6 Drawing Sheets

SYSTEMS AND METHODS FOR USING AN ACCESS POINT FOR TESTING MULTIPLE DEVICES AND USING SEVERAL CONSOLES

FIELD OF THE INVENTION

The present invention generally relates to hardware and software testing and verification and, more particularly, to methods and systems for testing software on devices using an access point and one or more consoles.

BACKGROUND

Tools have been developed in recent years to aid in the design verification of hardware and software systems, for example software suites, hardware circuitry, and programmable logic designs. "Design verification" refers to the act of reviewing, testing, or otherwise determining and documenting whether the design output meets design input requirements. In order to assure that the design complies with its requirements, it is common to generate a large number of input or instruction sequences to assure that the design operates as intended under a wide variety of circumstances. In general, test systems produce a report indicating whether tests have been passed or failed, and in some cases, may even indicate a module that is estimated to be faulty.

Conventionally, to test a device under development (such as a mobile information device), or to test software designed to run on such a device, a developer connects the device to an appropriate test system. The target device under test may be connected to the test system either directly or via a communication emulator. The developer selects a battery of test programs to run on the target device while monitoring its behavior. Running the complete battery of tests can commonly take many hours or even days. This problem is particularly acute in testing low-end computing devices, such as cellular telephones and other mobile information devices, which have limited computing power and memory resources due to their small size. Thus, testing on the target device can become a serious bottleneck in the development cycle.

Moreover, the conventional test architecture does not address the needs of operators as compared to developers. Some device testers may test devices on private networks in which the test device is connected directly to a test workstation, or at least the test device and test workstation are located on the same private network. In contrast, an operator may wish to perform device testing on a test device located on a publicly accessible network. For example, a cellular telephone service provider may wish to test telephones on their publicly accessible cellular network using test workstations in their company network. However, in conventional systems, the test workstation would typically have to be located outside of the company firewall because the test device cannot breach the company firewall to communicate with the test workstation. This results in security risks because the test workstation is no longer protected by the firewall. Sensitive information on the test workstation would be left vulnerable to theft by hackers. For example, the test workstation may use a secret encryption key for communication with the test device. That secret key would be vulnerable to theft if located on a test workstation outside of the firewall.

SUMMARY

Methods and systems consistent with the present invention overcome the limitations previously described by enabling test workstations (or test consoles) to be located within the secure confines of a private network, behind a firewall, when testing a device on an unsecured, public network. To do so, methods and systems consistent with the present invention provide an application server to serve as a single access point or pass through between test consoles on a private network and test devices on a publicly accessible network. The test consoles and test devices may be coupled to the application server via wireless or electrical connection through other components.

Specifically, to run a test, the test console digitally signs a test program using a secret or private key and sends that test program through the firewall to the application server, which then passes the test program to the test device. Upon receipt, the test device runs the test program, and typically produces results. The test device sends the results to the application server, which then sends the results to the test console via the firewall. In accordance with methods and systems consistent with the present invention, the firewall is configured to accept communications from the application server, thus the introduction of the application server as a "proxy" enables communication between a test console on a secure network behind a firewall and a test device on an unsecured, publicly accessible network. As a result, the test console, and the secret keys contained therein, is not exposed to the security risks of conventional systems.

In one embodiment consistent with the present invention, a method in a data processing system having a computing device to be tested on a publicly accessible network and a test console on a private network protected by a firewall, comprising the steps of sending by the test console on the private network a test program through the firewall to the computing device on the publicly accessible network and testing the computing device by running the test program. The data processing system may include a subscriber-accessible network with an application server and wherein the sending step includes sending the test program to the application server on the subscriber-accessible network. The method may further comprise the step of receiving by the test console results of the test run on the computing device. The receiving step may include receiving the results via a subscriber-accessible application server, and the sending step may include sending an identifier that uniquely identifies the test console with the test program. The sending step may further include packaging the test program and digitally signing the package by the test console.

Another embodiment consistent with the present invention provides a computer-readable medium encoded with instructions that cause a data processing system to perform a method, the data processing system having a private network protected by a firewall, the private network including a test program generator, and the data processing system including a test device on a publicly accessible network outside of the firewall, the method comprising the steps of receiving by the test device a test program from the test program generator on the private network via the firewall and executing the test program by the test device on the publicly available network to perform a test. The method may further include the step of sending results from the test device to the test program generator, and sending the results through the firewall to the test program generator. The method may also include executing a plug-in corresponding to the test program to assist execution of the test program on the test device.

Still another embodiment consistent with the present invention provides a data processing system, comprising a subscriber-accessible network protected by a first firewall, wherein the subscriber-accessible network includes an application server, a private network protected by a second firewall, the private network including a test console, the second firewall configured to permit communication between the test console and the application server, and a public network outside of the first firewall and the second firewall, the public network comprising a test device that receives a test program from the test console via the application server. The computing device may be any device under test. In one embodiment consistent with the invention, the computing device is a wireless device, and may also be a Mobile Information Device Profile (MIDP)-compliant device or an equivalent thereof. The publicly accessible network may be a cellular telephone network. The first firewall may restrict access to the subscriber-accessible network from the publicly accessible network based on subscriber status. The test console may include a test harness that packages and digitally signs the test program. The test program may be bundled as a Java Archive (JAR)/Joint Application Development (JAD) file pair. The computing device may include a test agent for executing the test program.

Other systems, methods, features, and advantages of the invention will become apparent to one with skill in the art upon examination of the following figures and detailed description. It is intended that such additional systems, methods, features, and advantages be included within this description and be within the scope of the invention.

BRIEF DESCRIPTION OF THE DRAWINGS

The accompanying drawings, which are incorporated in and constitute a part of this specification, illustrate an implementation of the invention and, together with the description, serve to explain advantages and principles consistent with the invention. In the drawings.

DETAILED DESCRIPTION

Methods and systems consistent with the present invention provide an improved testing architecture that includes a test console and a relay server, which may be an application server, for coordinating testing with test devices on a unsecured wireless network. Communication between the test console, located on a secured network behind a firewall, and the test device, located on an unsecured wireless network, passes through the application server, which is located outside of the firewall and serves as a proxy to pass messages from the test device to the test console. This allows a test application and application data to remain behind a firewall on a secured network while the testing device remains outside the secured network, without violating security policies. A test application, such as a test harness, on the test console is used to select tests to be executed and display results. The test application is located on the test console, thus the test application data remains secured. The application server may act as a single access point that collects and provides test results to the test console from the test device and facilitates messaging to the test console through a test framework on the test console. The application server may use unique identifiers to identify various test devices and test consoles.

Reference will now be made in detail to an implementation consistent with the present invention as illustrated in the accompanying drawings.

Figure 1:
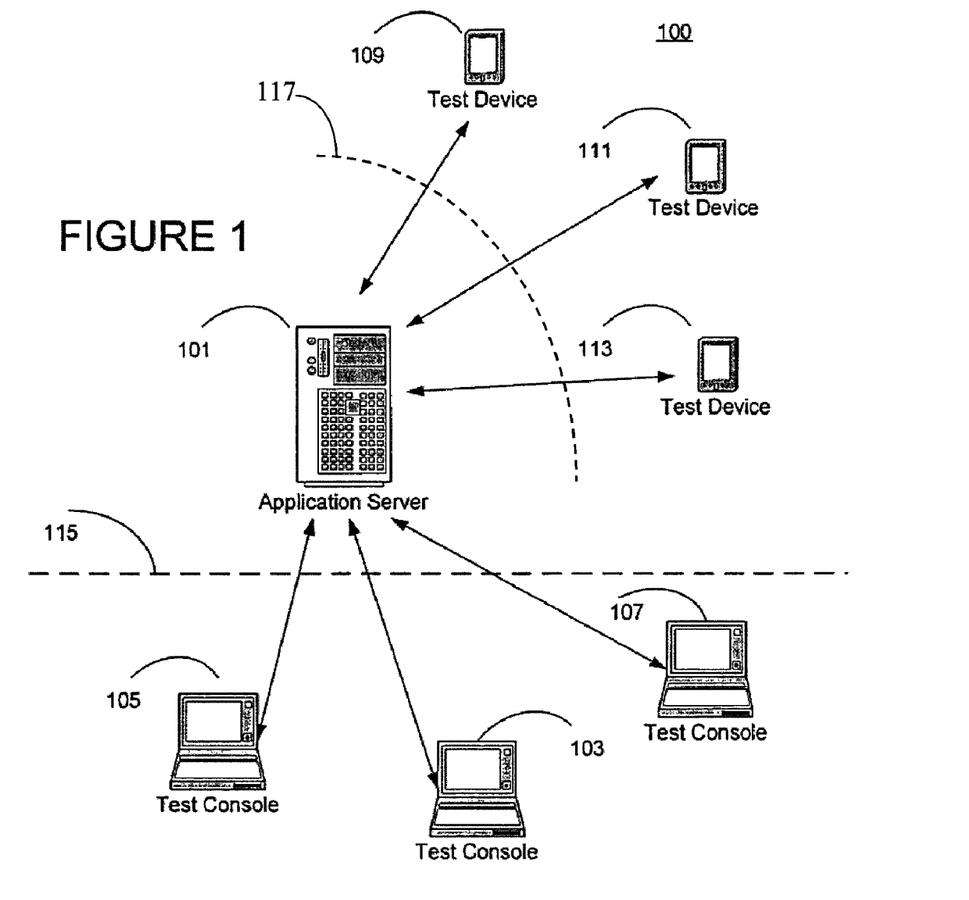
FIG. 1 illustrates a network environment in accordance with an embodiment consistent with the present invention.

FIG. 1 schematically illustrates a system 100 for testing software on a plurality of devices using, for example, a single access point and one or more consoles in accordance with an embodiment consistent with the present invention. The system 100 is built around an application server 101, which may act as the access point, and which is described in greater detail below. Test consoles 103, 105, 107 include a testing application and are located on the same private network. The test devices 109, 111, 113 are client devices that may be low-end devices with limited computing power and memory, for example, cellular telephones or personal digital assistants (PDA's). These test devices 109, 111, 113 may also be other types of devices. The test devices 109, 111, 113 are part of a publicly accessible network, for example, a cellular telephone network. The publicly accessibly network need not be accessible by the general public, but by a subset of the general public.

System 100 is arranged in demilitarized zone (DMZ) network configuration. The application server 101 exists in the DMZ of the network, and is protected by firewall 117. The application server 101 may communicate to test devices 109, 111, 113 on the publicly accessible network, however that communication may be restricted based on identity or amount of access by firewall 117. For example, access to the application server 101 may be limited to service subscribers or the kinds of data that may be sent to or received from the application server. Moreover, the application server 101 may communicate with test consoles 103, 105, 107 through firewall 115. Firewall 115 protects the private network including the test consoles 103, 105, 107. Because firewall 115 protects the private network, firewall 115 provides greater access restriction than firewall 117. Application server 101 may communicate through firewall 115, however test devices 109, 111, 113 cannot. Thus, communication between test devices 109, 111, 113 and test consoles 103, 105, 107 is brokered by application server 101.

In the description that follows, the test devices 109, 111, 113 are assumed to comply with MIDP, but the principles of the various embodiments consistent with the present invention are equally applicable to other types of low-end computing devices operating in accordance with other standards and specifications. Application server 101, test consoles 103, 105, 107, and test devices 109, 111, 113 may communicate using a test framework. An exemplary framework is provided in application Ser. No. 10/767,849, filed Jan. 29, 2004 and entitled "Automated Test Execution Framework with Central Management," which is commonly assigned herewith, and is herein incorporated by reference.

Test devices 109, 111, 113 and test consoles 103, 105, 107 receive, in one embodiment, a unique identifier for identifying themselves in communication with the application server 101, which can be assigned in accordance with the methods disclosed in application Ser. No. 10/767,850, filed Jan. 29, 2004 and entitled "Parallel Test Execution on Low-end Emulators and Devices," which is commonly assigned herewith, and is herein incorporated by reference. In one embodiment consistent with the present invention, test consoles 103, 105, 107 communicate with the application server 101 via a computer network such as a Local Area Network (LAN) or the Internet. In another embodiment consistent with the present invention, test devices 109, 111, 113 communication with application server 101 via a wireless network, such as but not limited to a cellular network, an 802.11 Wi-Fi network, or a Bluetooth network.

Figure 2:
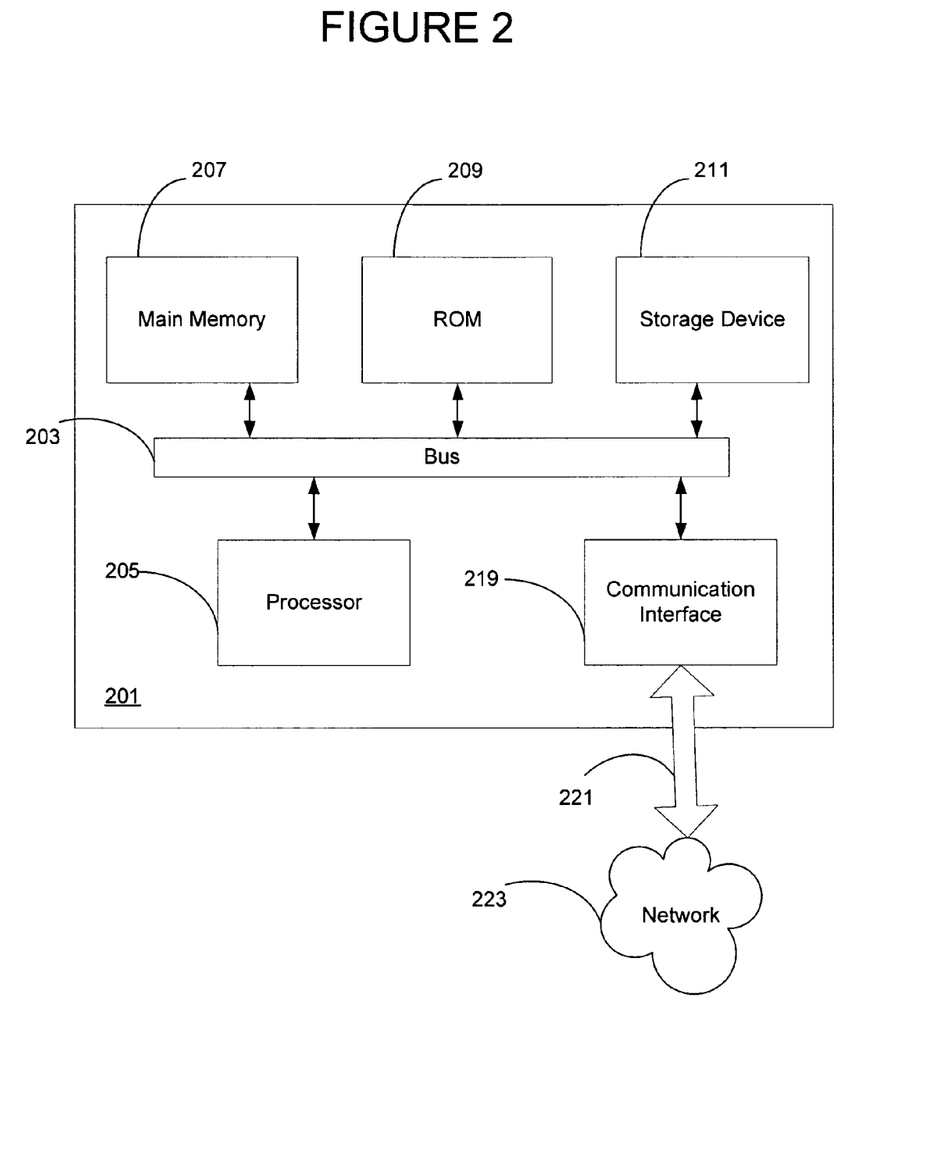
FIG. 2 illustrates an exemplary computer system.

FIG. 2 is a diagram of a computer system that can be configured as an application server or a test console consistent with various embodiments in accordance with the present invention. Computer system 201 includes a bus 203 or other communication mechanism for communicating information, and a processor 205 coupled with bus 203 for processing the information. Computer system 201 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Computer system 201 further includes a read only memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment, processor 205 executes one or more sequences of one or more instructions contained in main memory 207. Such instructions may be read into main memory 203 from another computer-readable medium, such as storage device 211. Execution of the sequences of instructions in main memory 207 causes processor 205 to perform the process steps described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Further, the instructions to support the system interfaces and protocols of system 100 may reside on a computer-readable medium. The term "computer-readable medium" as used herein refers to any medium that participates in providing instructions to processor 205 for execution. Common forms of computer-readable media include, for example, a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read.

Computer system 201 also includes a communication interface 219 coupled to bus 203. Communication interface 219 provides a two-way data communication coupling to a network link 221 that is connected to a local network 223. For example, communication interface 219 may be a network interface card. As another example, communication interface 219 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 219 sends and receives electrical, electromagnetic or optical signals that carry digital data streams representing various types of information.

Figure 3:
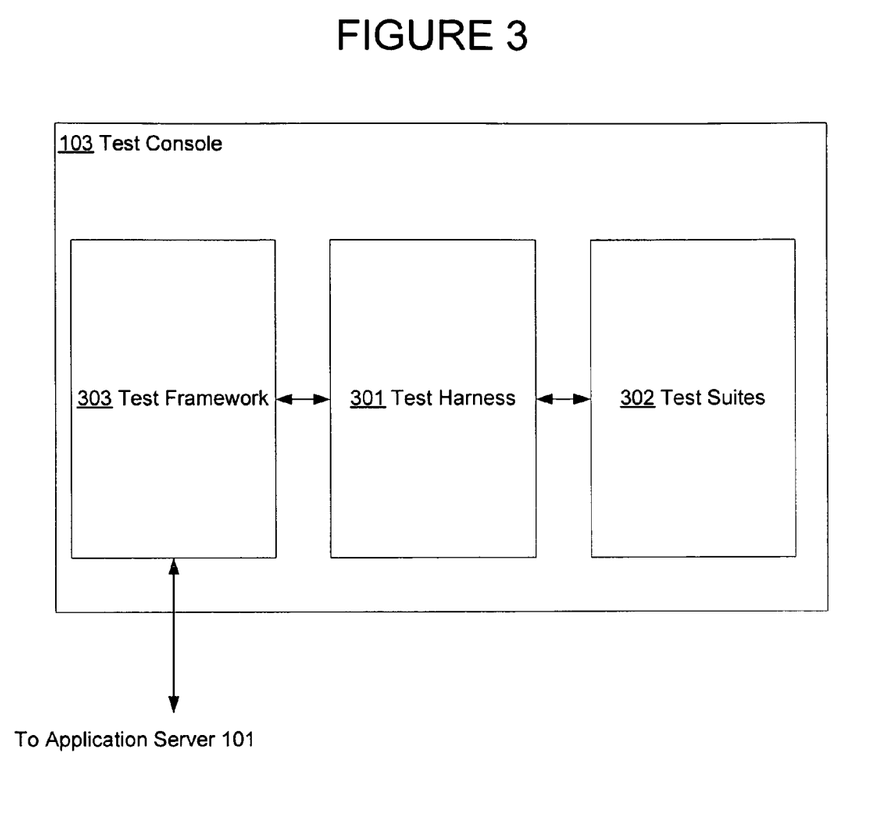
FIG. 3 illustrates a schematic of a test console in accordance with an embodiment consistent with the present invention.

FIG. 3 schematically illustrates software program components running on a test console, in accordance with an embodiment consistent with the present invention. The test console 103 allows a user to store test suites 302, select a test to be executed on test devices 109, 111, 113 (FIG. 1), and collect results of tests from the application server 101 for display to the user. Test console 103 includes a test harness 301, test suites 302, and a test framework 303. Test console 103 communicates with the application server 101 via the test framework 303. In one embodiment consistent with the present invention, the test framework 303 is the Java Device Test Suite (JDTS) framework available from Sun Microsystems, Inc. In another embodiment consistent with the present invention, the test framework 303 is the Java 2 Micro Edition (J2ME) Technology Compatibility Kit (TCK) framework available from Sun Microsystems. Test suites 302 are batteries of test programs to be executed on test devices 109, 111, 113 (FIG. 1). Test suites 302 may include different types of tests, such as a runtime test suite, a benchmark test suite, and an over-the-air (OTA) test suite, describe in more detail below.

The test harness 301 generates and deploys the tests to be carried out by the test devices 109, 111, 113 (FIG. 1). The test harness 301 loads test suites, configures a user's environment to run tests, executes tests, and reports test results received from the test device via the test framework 303. The test harness 301 is provided with a user interface that permits visualization of available test suites 302 and selection of tests of the test suites to be run. The user interface may display the test suites 302 and the tests comprising the test suites 302 as a hierarchy of test names or identifiers that reference test program objects. In one embodiment consistent with the present invention, the test harness 301 is the JavaTest harness available from Sun Microsystems.

The tests from the test suites 302 are typically packaged in the form of Java applications contained in a set of JAD and JAR files. Each JAR file of this sort, together with its accompanying JAD file, is referred to hereafter as a test bundle. The application server 101 downloads the JAD file to the test device 109, 111, 113. Alternatively, the application server provides the JAD file to a web server (not shown), and the web server downloads the JAD file to the test device 109, 111, 113. The JAD file contains environment settings and some environment demands. The test device 109, 111, 113 evaluates the JAD file to ensure that the device is able to accept the MIDlet. For example, the JAD file for a given MIDlet may specify that the device must support MIDP version 2.0. If the device does not support this version, it rejects the application download, and saves the time that would otherwise be consumed by downloading the much larger JAR file.

Figure 4:
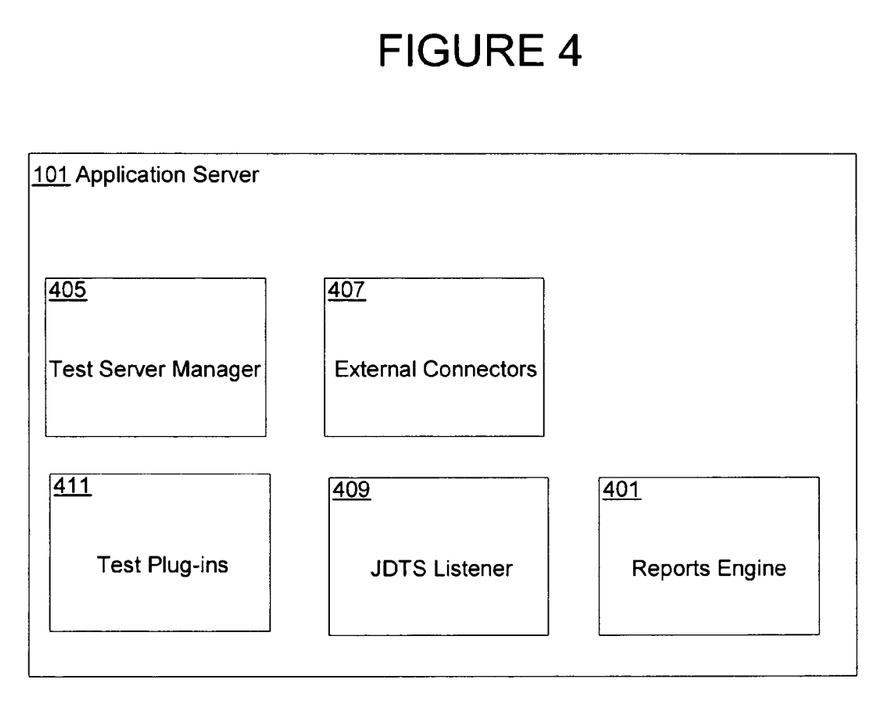
FIG. 4 illustrates a schematic of an application server in accordance with an embodiment consistent with the present invention.

FIG. 4 schematically illustrates software program components running on the application server 101 of FIG. 1, in accordance with an embodiment consistent with the present invention. Application server 101 comprises a reports engine 401, a test server manager 405, external connectors 407, JDTS listener 409, and test plug-ins 411. The reports engine 401 collects reports of test results upon request from test runners, stores reports and provides access to reports, searches existing reports (e.g., according to date, owner, etc.), and compares existing reports and evaluates differences. The test server manager 405 identifies tests that use pre-installed test server manager server-side implementations, and directs the working tests to the correct test plug-ins 411. Each test plug-in 411 is supplied as part of the test suite 302 that implements it. When an administrator deploys a new test suite 302 to the test console 103, a corresponding plug-in 411 is installed on the application server 101 and used to communicate regarding the corresponding test. The application server 101 executes the proper plug-in 411 when the test is executed. The external connectors module 407 enables the addition of specific connections to the application server 400, for example, to test malfunctions with the network on the test devices 109, 111, 113. The JDTS listener 409 handles commands arriving from the test consoles 103, 105, 107 (FIG. 1), thus providing a single protocol of communication with external entities.

Figure 5:
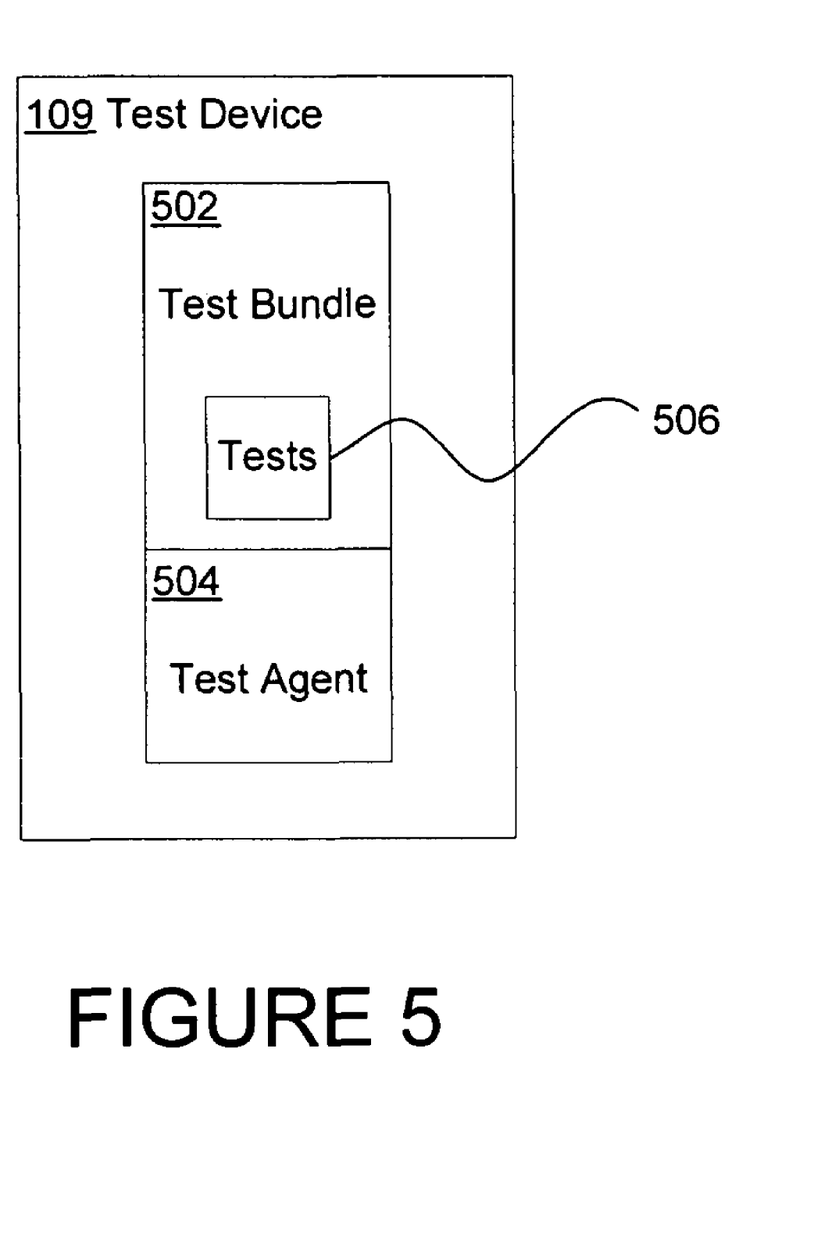
FIG. 5. illustrates a schematic of a test device in accordance with an embodiment consistent with the present invention.

FIG. 5 schematically depicts an exemplary test device 109. Once the JAR file for the test bundle 502 including tests 506 is downloaded from the application server 101 to test device 109 and stored in the local device memory, the test device is ready to run the tests of the test bundle. In order to run Java applications, the test devices 109, 111, 113 contain an implementation of the Connected Limited Device Configuration (CLDC) specification with an implementation of the MIDP specification running over the CLDC. These applications are known as MIDlets, and are created by extending an API MIDlet class of the MIDP. Thus, in one embodiment consistent with the invention, each test bundle 502 is actually a MIDlet packaged in the form of a JAD/JAR file pair. The JAR file typically contains a test agent 504, which executes the tests 506. To start test execution, the test agent 504 addresses the application server 101 in order to receive instructions regarding the next test to run and to report test results, typically using a protocol based on HTTP. Each request that is addressed by the test agent 504 to the application server 101 typically includes the unique identifier that has been assigned to the particular one of the devices 109, 111, 113, so that the application server 101 is able to recognize the client and serve it in the correct manner.

Figure 6:
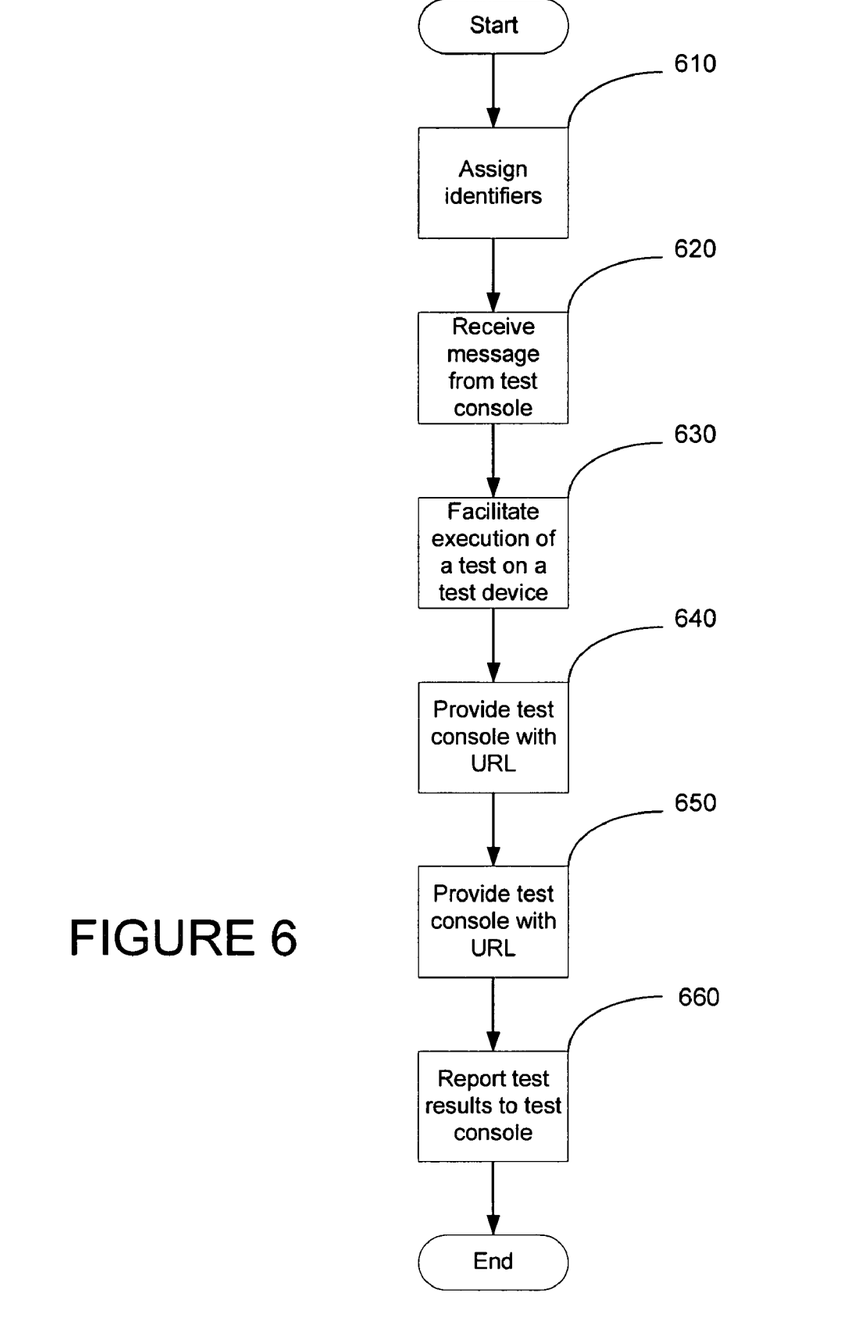
FIG. 6 illustrates a flow chart of a method for testing computer devices in accordance with an embodiment consistent with the present invention.

FIG. 6 illustrates a flowchart of a method for testing computing devices in accordance with an embodiment consistent with the present invention. At step 610 and also with reference to FIG. 1, the application server 101 assigns unique identifiers to the test devices 109, 111, 113 and the test consoles 103, 105, 107. In response to a user's test selection, test console 103 packages and digitally signs a test bundle for the select test, and sends the signed test bundle to the application server 101 (step 615). The application server 101 receives the test bundle and provides the test bundle to test device 109 (step 620). The test device 109 receives the test bundle and unpacks it (step 625). The test device 109 then executes the test(s) in the test bundle (step 630). Automatically or in response to a request from the application server 101, the test device sends results of the test(s) to the application server (step 635). The application server 101 receives the test results from the test device 109, and provides the test results to the test console 103 (step 640). The test console 103 receives the test results from the application server 101 and displays the results to the user (step 645).

With reference to FIG. 3, the test suites 302 include a runtime test suite, a benchmark test suite, and an OTA test suite. The benchmark test suite may include automated tests and interactive tests. In an automated test, the user or the test device 109 launches a test agent 504 that executes a test bundle 502 and returns the results to application server 101. In interactive tests, the test agent 504 requests the next test 506 in the test bundle 502 to run from test console 103 via the application server 101. The test harness 301 displays an instruction message and evaluation buttons to the user. The user follows the instructions observing the test device 109, and clicks a pass/fail button in response to the test results.

The benchmark test suite is equivalent to an automated test of interactive tests, but does not determine whether the test passes or fails. The test fails if the value does not meet a threshold value. The threshold value is determined by running benchmark tests against a test device 109 whose performance has been judged acceptable and then saving those results in a threshold file.

With the OTA test suite, a provisioning server supplies applications over the air to wireless devices. The OTA provisioning tests verify that the test device 109 interacts correctly with an emulated OTA provisioning server. For an interactive test, the user selects an interactive OTA test for execution. With reference to FIG. 1, the test console 103 instructs the application server 101 to make the correct package available to a test device 109. The application server 101 then sends an indication to the test console 103 to display the proper test instructions to be followed by the user. Next, the test console 103 prepares the proper application (JAD File) for download and supplies this package at the request of the test device 109. The test console 103 then displays a download URL for the test device 109. The user uses the URL to access the application on the web server. The user then launches the MIDlet, and the user follows instructions to evaluate the device's response. The user presses passed or failed buttons according to their findings.

In a semi-automated test, the user selects a semi-automated OTA test for execution. The application server 101 sends indication to the test console 103 to display the proper test instructions to be followed by the user, but does not include a passed/failed button. A web server then prepares the proper application (JAD File) for download and supplies this package at the request of the test device 109. The test console 103 displays a download URL for the test device 109 and the user uses the URL to access the application on the web server. The test device 109 then sends a notification to an emulated provisioning server. The emulated provisioning server examines response and determines if the test device passed or failed and sends this determination to the test console 103.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

We claim:

1. A method for testing a computing device, said method comprising the steps of:

sending a test program from a test console to an application server, wherein the test console is disposed within a private network, wherein said sending a test program from a test console sends the test program through a first firewall, wherein the first firewall is disposed between the private network and the application server, wherein the sending a test program from a test console step includes packaging the test program and digitally signing the package by the test console;

sending the test program from the application server to a computing device, wherein said sending the test program from the application server sends the test program through a second firewall and then across a publicly accessible network, wherein the application server is communicatively coupled only through the second firewall to the publicly accessible network, wherein the publicly accessible network comprises the computing device, wherein the second firewall is disposed between the application server and the publically accessible network, wherein the application server is disposed between the private network and the publicly accessible network, wherein the application server is disposed between the first firewall and the second firewall; and testing the computing device by running the test program via a test agent on the computing device.

2. The method of claim 1, further comprising the step of receiving by the test console results of the test run on the computing device.

3. The method of claim 2, wherein the receiving step includes receiving the results via a subscriber-accessible application server.

4. The method of claim 1, wherein the sending a test program from a test console step includes sending an identifier that uniquely identifies the test console with the test program.

5. A non-transitory computer-readable medium encoded with instructions that cause a data processing system to perform a method, said method comprising the steps of:
   generating, by a test generator on a private network, a test program on the private network;
   sending the a test program from the private network through a first firewall to an application server, wherein the first firewall is disposed between the private network and the application server, wherein the sending a test program from a test console step includes packaging the test program and digitally signing the package by the test console;
   sending the test program from the application server through a second firewall and across a publically accessible network to a test device on the publicly accessible network, said application server being communicatively coupled only through the second firewall to the publicly accessible network, wherein the second firewall is disposed between the application server and the publically accessible network, wherein the application server is disposed between the private network and the publicly accessible network, wherein the application server is disposed between the first firewall and the second firewall; and
   testing the test device by running the test program via a test agent on the test device.

6. The non-transitory computer-readable medium of claim 5, further comprising the step of receiving, at the test program generator, results from running the test program.

7. The non-transitory computer-readable medium of claim 6, wherein results from running the test program are transmitted through the first and second firewalls to the test program generator.

8. The computer-readable medium of claim 5, further comprising executing a plug-in corresponding to the test program to assist execution of the test program on the test device.

9. The non-transitory computer-readable medium of claim 5, wherein the test device is a MIDP-compliant device.

10. The non-transitory computer-readable medium of claim 5, wherein the publicly accessible network is a cellular telephone network.

11. A data processing system, comprising:
    a private network;
    a test console, wherein the private network comprises the test console;
    a first firewall, wherein the first firewall protects the private network;
    an application server, wherein the first firewall is configured to permit communication between the test console and the application server, wherein the application server and the test console are disposed on opposites sides of the first firewall;
    a second firewall, wherein a publicly accessible network is communicatively coupled only through the second firewall to the application server, wherein the application server and the publicly accessible network are disposed on opposites sides of the second firewall;
    a computing device on the publicly accessible network;
    a test agent on the computing device; and
    a test program, wherein the computing device receives the test program from the test console via the application server across the publicly accessible network, and wherein the test agent executes the test program, wherein the test console includes a test harness that packages and digitally signs the test program.

12. The system of claim 11, wherein the computing device is a wireless device.

13. The system of claim 11, wherein the publicly accessible network is a cellular telephone network.

14. The system of claim 11, wherein the computing device is a MIDP-compliant device.

15. The system of claim 11, further comprising:
    a plurality of test consoles in communication with the application server, wherein the private network comprises the plurality of test consoles;
    a plurality of computing devices, wherein the publicly accessible network comprises the plurality of computing devices, wherein for each computing device of the plurality of computing devices:
       the computing device receives a test program from at least one of the plurality of test consoles via the application server across each of the first firewall, the second firewall, and the publicly accessible network; and
       the computing device includes a test agent for executing a received test program.

16. The system of claim 15, wherein the application server comprises a test server manager and a plurality of test plug-ins.

17. The system of claim 15, wherein each of the plurality of test consoles:
    stores test suites;
    selects a test to be executed on one or more of the plurality of computing devices; and
    collects results of executed test programs from the application server.

18. The system of claim 17, wherein each of the plurality of computing devices is a wireless device, and the publicly accessible network is a cellular telephone network.

* * * * *